United States Patent Office 3,702,134
Patented Nov. 7, 1972

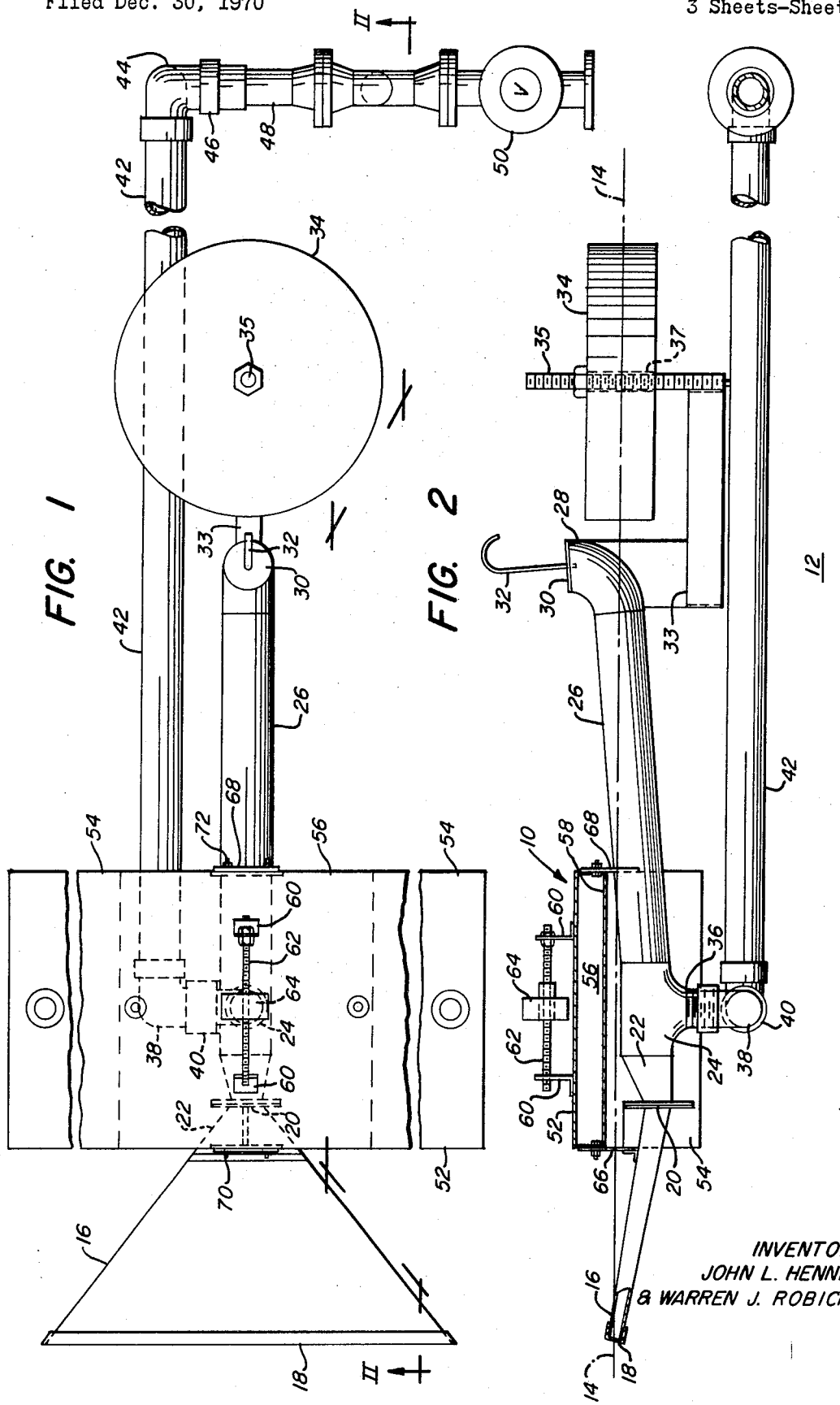

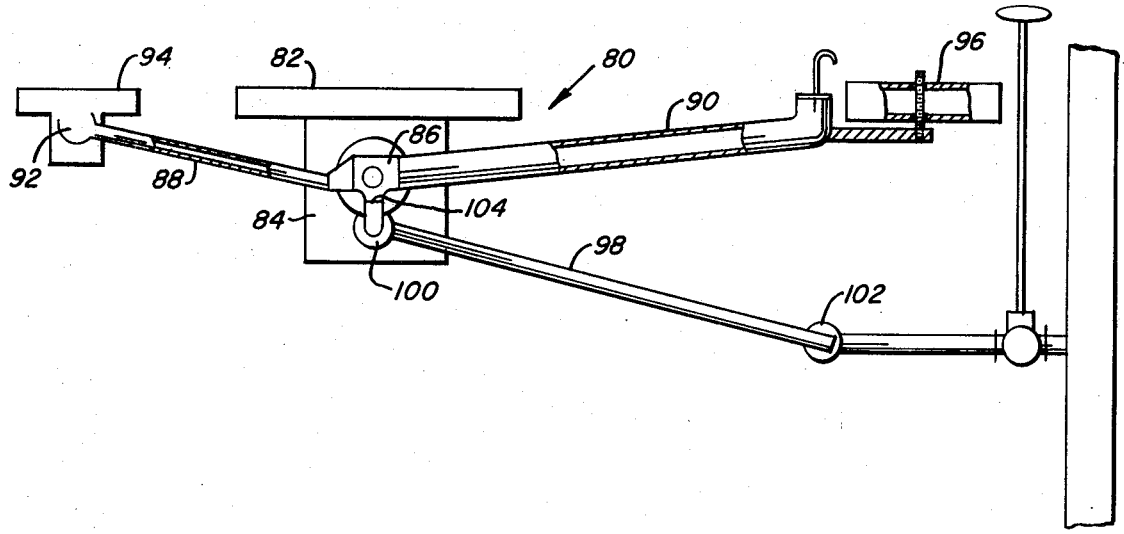
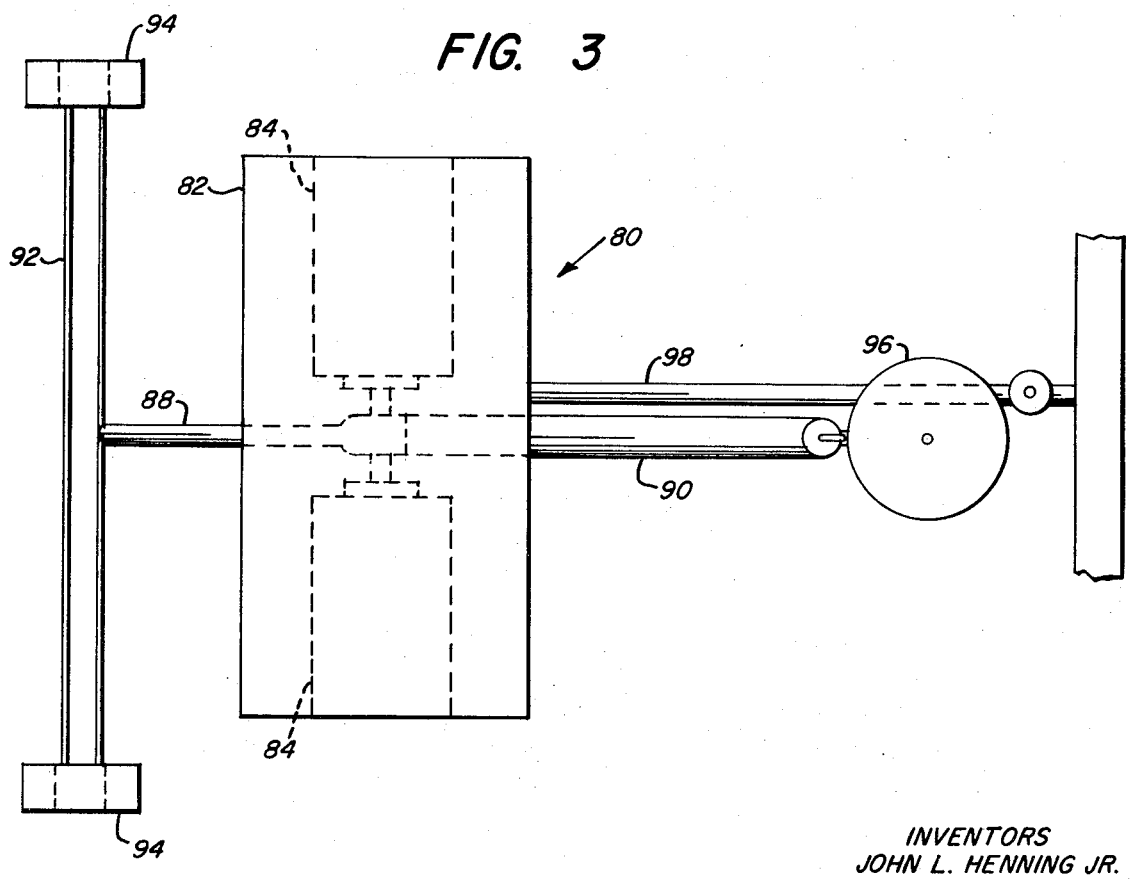

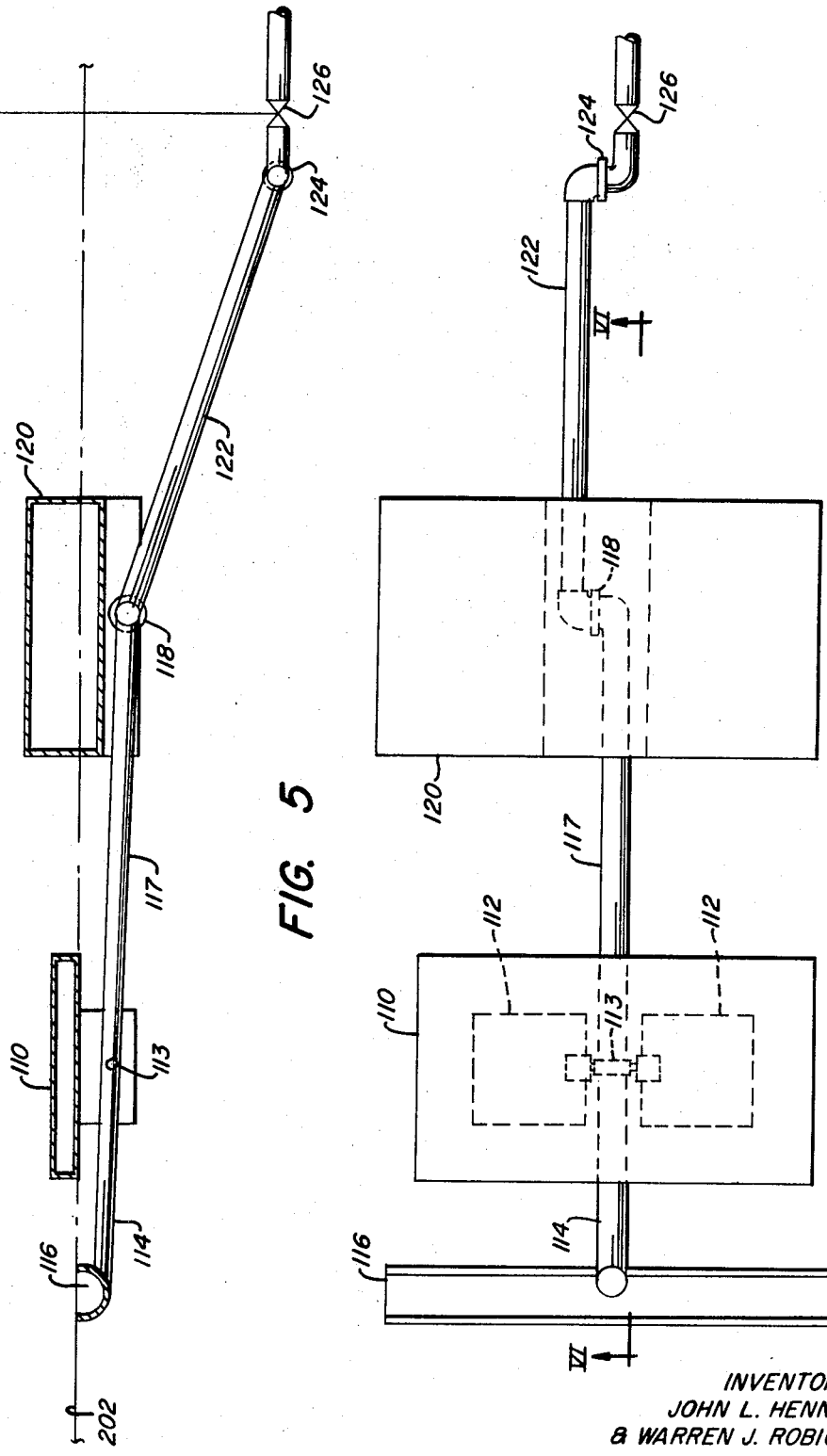

3,702,134
OVERFLOW-TYPE FLOATING SKIMMER
John L. Henning, Jr., and Warren J. Robicheaux, Port Arthur, Tex., assignors to Gulf Oil Corporation, Pittsburgh, Pa.
Filed Dec. 30, 1970, Ser. No. 102,798
Int. Cl. C02b 9/02
U.S. Cl. 210—242
12 Claims

ABSTRACT OF THE DISCLOSURE

Apparatus for skimming oil from the surface of water in which oil overflowing a weir drains into an overflow conduit joined to a counterbalancing duct. A float supports the juncture of the overflow conduit and counterbalancing duct at a substantially constant position relative to the liquid level. A drain line is connected to the counterbalancing arm whereby a difference in the rate at which liquid flows through the overflow conduit and the drain line causes a change in the liquid level in the counterbalancing duct. A change in volume of liquid in the counterbalancing arm rotates the overflow conduit to change the level of the weir and thereby adjust the flow through the overflow conduit to approximately that through the drain line. A float secured to the counterbalancing duct stabilizes operation of the apparatus.

---

This invention relates to the separation of immiscible liquids, and more particularly to apparatus for skimming a layer of a first liquid from the surface of a body of another liquid on which the first liquid floats.

Many chemical processing plants, oil refineries, and other manufacturing plants contaminate water that is used in the manufacturing operation. Before discharging waste water from the plants, that water is delivered into a settling pond to separate materials having a different specific gravity from the water. Heavy solid particles settle to the bottom of the pond, and liquids immiscible with water and having a lower specific gravity rise to the surface. The water-immiscible liquid of low specific gravity is usually oil, and for convenience will be referred to as oil in this specification; however, the apparatus is useful for the separation of any two immiscible liquids of different density.

Float-supported skimmers have been used in separating the layer of oil from water in a settling pond to provide a structure that will remain operative even though the liquid level in the pond fluctuates widely. Oil flows over one side, referred to as a weir, of a collecting tank supported by the floats and is pumped from the tank to suitable apparatus for disposal. One problem that has been encountered with float-supported collecting tanks is variation in the level of the liquid in the collection tank. If the level of liquid in the tank rises because the rate of overflow exceeds the rate of pumping from the tank, the added weight of the tank and its contents lowers the weir and increases the rate of flow into the tank. The increased flow into the tank further increases the weight of the contents of the tank with the eventual result of flooding the tank. Conversely, if the rate of pumping from the tank exceeds the rate of overflow into the tank, the weight of the contents in the tank is reduced, and the tank floats higher in the pond with a consequent reduction in rate of overflow into the tank. Constant attention by operators or expensive control equipment has been required to keep the skimmer functioning properly.

One method that has been used in an effort to make operation of float-supported skimmers automatic is to pivotally support the collection tank off-center whereby a change in the level of liquid in the tank rotates the tank and changes the level of the side of the tank forming the weir. With this arrangement, a reduction in the level of liquid in the tank lowers the weir and increases the flow into the tank.

Ordinarily, the layer of oil on the surface of the settling pond has a thickness of the order of one inch or less. Since it is essential to the proper functioning of the skimmer that the amount of water allowed to overflow into the oil collecting system be as small as possible, accurate control of the level of the weir within very narrow limits is important. To obtain the necessary accurate positioning of the height of the weir, the skimmer must be sensitive to small changes in the volume of liquid in the collecting system to eliminate variations in the height at which the apparatus is supported by the floats as well as to control the rotation of the apparatus that changes the elevation of the weir.

This invention resides in float-supported apparatus for removing oil from the surface of a settling pond in which a skimmer delivers oil into an overflow conduit communicating with a counterbalancing duct of larger volume than the overflow conduit. The counterbalancing duct and overflow conduit are supported by the float at the juncture of the conduit and duct. A drain line that is flexible or provided with swing joints to allow vertical movement of the apparatus discharges from the apparatus the liquid that enters the apparatus through the skimmer. Liquid on backing up in the drain line enters the counterbalancing duct and causes pivoting of the overflow conduit to raise the level of the skimmer. A stabilizing float is affixed to the counterbalancing duct to limit movement of the counterbalancing duct and prevent hunting.

In the drawings:

FIG. 1 is a plan view of skimming apparatus embodying this invention.

FIG. 2 is a vertical sectional view along section line II—II in FIG. 1.

FIG. 3 is a plan view of an embodiment of this invention in which the overflow conduit and the counterbalancing duct are pivotally mounted for rotation independently of the float.

FIG. 4 is an elevational view partially in vertical section of the embodiment illustrated in FIG. 3.

FIG. 5 is a plan view of an embodiment of this invention in which the counterbalancing duct is a continuation of the overflow conduit, and the drain line is connected to the end of the counterblancing duct remote from the skimmer.

FIG. 6 is a vertical sectional view of the embodiment of the invention illustrated in FIG. 5.

Referring to FIG. 2 of the drawings, a skimming apparatus indicated generally by reference numeral 10 is shown floating in a settling pond 12 having a liquid level 14. Separating apparatus 10 includes a skimmer 16 having an inlet 18 at its outer end. The lower edge of inlet 18 serves as a weir over which oil flows to enter the skimmer. Skimmer 16 illustrated in FIGS. 1 and 2 is in the form of a thin flattened funnel which forms an overflow conduit tapering from the inlet 18, which extends across the full width of the skimmer, to a circular flanged outlet 20. Skimmer 16 slopes downwardly at a slight angle, for example approximately 10 degrees from the inlet 18 at the liquid level 14 to the outlet. The flanged outlet 20 joins an off-center adapter 22 connected to the line opening of a T 24. The lower side of adapter 22 is subustantially horizontal when the T 24 is in the normal position illustrated in FIG. 2; hence, the upper edge of the T 24 is above the level of the opening in the outlet from the skimmer 16. Skimmer 16 and adapter 22 provide an overflow conduit through which liquid entering through the inlet 18 in the skimmer flows to the T 24.

Extending from the end of T 24 opposite its connection to adapter 22 is a counterbalancing duct 26 of substantially larger diameter than adapter 22 and having a length longer than the distance from the center of T 24 to inlet opening 18. In the embodiment illustrated in FIGS. 1 and 2, counterbalancing duct 26 is a pipe having an upwardly facing L 28 connected at its outer end. The end of L 28 is closed by a cap 30 through which a vent line 32 passes to maintain atmospheric pressure in the counterblancing duct. Counterbalancing duct 26 slopes upwardly from T 24 to the connection to the L 28 at an angle less than the slope of skimmer 16, for example about 5 degrees, that normally places the center of the end of the duct connected to L 28 approximately at the liquid level. The volume of the counterbalance line is approximately twice the volume of skimmer 16.

A stabilizing float 34 is secured to the outer end of counterbalancing duct 26 to limit movement of the counterbalancing duct during operation of the separator and to hold the skimmer opening 18 in the proper position to begin or resume skimming. A bracket 33 extending outwardly from L 28 supports a threaded vertical rod 35 on which float 34 is mounted. A threaded sleeve 37 extending vertically through the float 34 engages rod 35 to permit adjustment of the level of float 34.

The lateral outlet 36 of T 24 faces downwardly and is connected to an L 38 which in turn is connected to a swivel joint 40 that allows the L38 to rotate about a horizontal axis. Extending from the swivel joint 40 is a drain pipe 42 connected at its end opposite swivel joint 40 to an L 44 which in turn is connected to a second swivel joint 46 allowing L 44 to pivot about a horizontal axis. Swivel joint 46 is connected to a flanged discharge line 48 provided with a valve 50, which could be remotely located, for control of the rate of discharge of liquid from the apparatus 10. L 38, pipe 42, L 44, and swivel joints 40 and 46 provide one embodiment of a flexible drain line from the T 24 for delivery of liquid separated from the surface of settling pond 12.

The skimming apparatus 10 includes a float 52 which supports the skimming apparatus at an operative level in spite of variation in the liquid level 14. The float 52 illustrated in FIGS. 1 and 2 has two lateral chambers 54 of substantial depth jointed by a thin central chamber 56. The lower surface 58 of central chamber 56 of the float is normally a short distance above and preferably almost in contact with the liquid level 14. With this arrangement, the lateral chambers 54 of the float provide buoyancy supporting the separating apparatus 10 while the central chamber 56 adds to the stability of the apparatus. Extending upwardly from the upper surface of central chamber 56 is a pair of spaced arms 60 supporting a threaded rod 62. An adjusting weight 64 on rod 62 can be rotatively moved from one end of the rod to the other for trim-balancing the apparatus 10.

Attached to the upper surface of skimmer 16 is a slotted plate 66. A similar slotted plate 68 is attached to the counterbalancing duct 26 and extends upwardly therefrom. Bolts 70 and 72 extend outwardly from the ends of the central chamber 56 of float 52 through the slots and plates 66 and 68, respectively. Nuts on the outer end of bolts secure the plates 66 and 68 whereby the skimming apparatus is supported at the desired elevation by the float 52.

In the operation of the skimming apparatus, the levels of the skimmer 16 and counterbalancing duct 26 below float 52 and the position of float 34 on threaded rod 35 are adjusted to locate inlet 18 above the level of the oil-water interface but below the liquid level 14. Swivels 40 and 46 allow vertical movement of float 52 with changes in the liquid level 14. Valve 50 is open and liquid entering through inlet 18 flows through the funnel-shaped skimmer 16 into the T 24 and through the drain line for discharge from the system. If the rate of flow through inlet 18 is such that the T 24 is not full and the liquid drains directly from outlet 20 into the lateral outlet 36 of the T thereby leaving the counterbalancing duct 26 substantially empty of liquid, the counterbalancing duct rises and lowers inlet 18 to increase the cut of oil from the pond. If the opening of valve 50 does not allow liquid to drain as rapidly as it enters through opening 18, the liquid level in the T 24 rises, and the liquid flows into the counterbalancing duct 26. The weight of liquid in conterbalancing duct 26 lowers float 34 and thereby rotates T 24 in a clockwise direction in FIG. 2 about the axis of swivel joint 40. The clockwise rotation of T 24 elevates inlet 18 and thereby makes a thinner cut which reduces the rate at which liquid flows into the skimmer 16. In the apparatus illustrated in FIGS. 1 and 2, T 24 rotates with tilting of the float 52. The small amount of movement of inlet 18 required for substantial change in the rate of flow into the skimmer 16 makes necessary only a very slight tilting of the float 52 which does not harm the sensitivity of the skimming apparatus. Float 52 is large relative to float 34 and provides a stable base about which the overflow conduit and counterbalancing duct 26 rotate. The small volume of liquid required to depress the counterbalancing duct has no significant effect on the level of float 52. A small volume of liquid in counterbalancing duct 26 will cause the rotation which controls the position of inlet 18, but float 34 limits the extent of movement of the counterbalancing duct. The combination gives a sensitive, yet stable, apparatus for removal of oil from the surface of the pond.

The apparatus illustrated in FIGS. 3 and 4 differs from that illustrated in FIGS. 1 and 2 principally in the type of skimmer and its suspension from the float. Referring to FIG. 3, the skimming apparatus indicated generally by reference numeral 80 includes a float 82 having spaced-apart buoyancy chambers 84 extending downwardly therefrom for a substantial distance to provide the buoyancy necessary to float the apparatus. Pivotally supported between the buoyancy chambers 84 is a T 86 having an overflow conduct 88 extending from one of the line outlets and a counterbalancing duct 90 from the other line outlet. Overflow conduit 88 is connected to the midpoint of a skimmer 92 which is in the form of a pipe open along its upper surface. Floats 94 at the ends of overflow pipe 92 stabilize its vertical position at the fluid surface and maintain it in a horizontal position. Counterbalancing duct 90 is attached at its outer end to a stabilizing float 96 in a manner similar to counterbalancing duct 26 and stabilizing float 34. The operation of the apparatus illustrated in FIGS. 3 and 4 is similar to that described for the embodiment illustrated in FIGS. 1 and 2. The pivotal support of T 86 eliminates any rotation of float 82 as the liquid level in counterbalancing duct 90 changes. A drain line 98 including a pair of swivel joints 100 and 102 is connected to the lateral outlet 104 of T 86 for discharge of liquid skimmed by the apparatus.

In the embodiment of the invention illustrated in FIGS. 5 and 6, the oil skimmed from the surface of the water must flow through the counterbalancing duct before it enters the drain line. Referring to FIG. 6, a float 110 has a pair of spaced, downwardly projecting, buoyancy chambers 112 between which an overflow conduit 114 is pivotally suspended by pivot 113. At the left end of overflow conduit 114, as shown in FIGS. 5 and 6, is a skimmer pipe 116. Skimmer pipe 116 is a section of pipe, for example 4-inch pipe, cut longitudinally and closed at its ends to form an open-topped channel through which liquid overflowing the edge of the skimmer pipe is directed into overflow conduit 114. Overflow conduit 114 is joined at pivot 113 to the end of a counterbalancing duct 117 which continues to a swivel joint 118 supported by a stabilizing float 120. A drain line 122 extends from the swivel joint 118 to a second swivel joint 124. Counterbalancing duct 117 is approximately 1½ times as long as overflow conduit 114.

In the operation of the skimming apparatus illustrated in FIGS. 5 and 6, liquid overflowing into the skimmer pipe 116 is delivered through overflow conduit 114 and counterbalancing duct 117 into drain line 122 and discharged from the system. Normally the valve 126 in the discharge line is set to maintain a liquid level in drain line 122 between swivel joint 118 and swivel 124. If the valve is opened too wide, the level of liquid in drain pipe 122 falls which reduces the load carried by stabilizing float 120. That float and the right-hand end of counter-balancing duct 117 rise and cause overflow conduit 114 to pivot about pivotal support 113 and lower the skimmer pipe 116. The lowering of the skimmer pipe increases the rate at which liquid flows into the overflow conduit and thereby raises the level of liquid in drain line 122 and the overflow conduit 114. It will be noted that the entire counterbalancing duct 117 is filled before the liquid backs up into overflow conduit 114. The greater length of counterbalancing duct 117 than overflow conduit 114 reduces the vertical movement of skimmer pipe 116 for a given vertical movement of the stabilizing float 120 to increase the accuracy with which the level of the overflow edge of the skimmer pipe is fixed.

The skimming apparatus of this invention is highly sensitive in that a small change in the volume of liquid in the apparatus will cause an adjustment of the level of the overflow weir. The high sensitivity contributes to the accuracy of positioning the level of the overflow weir by making insignificant any change in the level of the floats as a result of a change in the volume of liquid in the apparatus. The accuracy of control of the inlet of the overflow weir is further enhanced by the greater distance of the stabilizing float than the inlet from the pivotal center. A relatively large movement of the stabilizing float will result in a reduced movement of the inlet of overflow weir and thereby contribute to the accuracy of control of flow of liquids into the apparatus. The stabilizing float reduces hunting and thereby adds to the accuracy with which the level of the inlet can be controlled.

We claim:

1. Apparatus for removing a supernatant liquid from a body of liquid comprising a skimmer having an elongated horizontal inlet through which liquid can flow and an overflow conduit connected to the inlet to receive liquid therefrom, a counterbalancing duct rigidly connected to the end of the overflow conduit remote from the skimmer and forming a substantially linear extension of the overflow conduit, a flexible drain line connected to and communicating with the counterbalancing duct whereby liquid backing up in the drain line enters the counterbalancing duct and reduces the buoyancy thereof, the cross section area of the overflow conduit and the stabilizing duct being of approximately the same size as the drain line, and a supporting float connected to the overflow conduit and counterbalancing duct supporting the overflow conduit and counterbalancing duct in a substantially horizontal position, said supporting float having a volume relative to the volume of the counterbalancing duct and drain line such that the level of the apparatus in the liquid is substantially independent of the volume of liquid in the drain line and counterbalancing duct whereby changes in buoyancy of the counterbalancing duct tilt the apparatus about the float to adjust the level of the inlet.

2. Apparatus as set forth in claim 1 in which the volume of the counterbalancing duct is approximately two times the volume of the overflow conduit.

3. Apparatus as set forth in claim 1 in which a stabilizing float is secured to the counterbalancing duct to stabilize the counterbalancing duct.

4. Apparatus as set forth in claim 1 in which a pivotal connection is mounted on the supporting float, and the overflow conduit and counterbalancing duct are supported by the pivotal connection to permit rotation of the overflow conduit independently of the supporting float.

5. Apparatus as set forth in claim 1 in which the counterbalancing duct and the overflow conduit are connected to opposing in-line outlets of a T, the counterbalancing duct and the overflow conduit slope upwardly from the T, the slope of the counterbalancing duct is about one-half of the slope of the overflow conduit, the volume of the counterbalancing duct exceeds the volume of the overflow conduit and the lateral outlet of the T opens downwardly and is connected to the drain line.

6. Apparatus as set forth in claim 1 in which the inlet to the skimmer is an elongated slit along the upper surface of a pipe, floats at the ends of the pipe stabilize the skimmer in a horizontal position, the overflow conduit is a pipe extending at substantially a right angle at a midpoint of the pipe in which the slot forms the inlet and a stabilizing float is secured to the counterbalancing duct.

7. Apparatus as set forth in claim 1 in which the overflow conduit and counterbalancing duct are pipes, the counterbalancing duct is connected at one of its ends to the overflow conduit and at the other end to the flexible drain line, a pivotal support is mounted on the supporting float and connected to the juncture of the overflow conduit and counterbalancing duct, and a stabilizing float supports the counterbalancing duct at the juncture of the counterbalancing duct and the drain line.

8. Apparatus as set forth in claim 1 in which the counterbalancing duct is substantially longer than the overflow conduit and extends laterally a substantial distance beyond the supporting float.

9. Apparatus as set forth in claim 1 in which the supporting float comprises a pair of spaced apart buoyancy chambers of substantial volume and depth, a stabilizing chamber between and secured to each of the buoyancy chambers and adapted to maintain the buoyancy chambers in a spaced apart position with the buoyancy chambers separated a distance substantially less than the length of the inlet, the lower surface of the stabilizing chamber being at substantially the liquid level to limit vertical movement of the apparatus with respect to the surface of the liquid and the juncture of the overflow conduit and counterbalancing duct is between the buoyancy chambers.

10. Apparatus as set forth in claim 9 in which the overflow conduit and stabilizing duct are pipes having a diameter substantially less than the length of the inlet.

11. Apparatus as set forth in claim 10 in which the drain line is connected to the juncture of the overflow conduit and stabilizing duct.

12. Apparatus as set forth in claim 10 in which the drain line is connected to the end of the counterbalancing duct remote from the overflow conduit.

References Cited

UNITED STATES PATENTS

| | | | |
|---|---|---|---|
| 2,330,508 | 9/1943 | McCall | 210—242 |
| 3,369,664 | 2/1968 | Dahan | 210—DIG 21 |
| 2,608,300 | 8/1952 | Small | 210—242 |
| 3,534,859 | 10/1970 | Amero et al. | 210—242 |
| 836,335 | 11/1906 | Nichols | 210—242 |

REUBEN FRIEDMAN, Primary Examiner

T. A. GRANGER, Assistant Examiner

U.S. Cl. X.R.

210—DIG 21